United States Patent
Su et al.

(10) Patent No.: US 10,339,688 B2
(45) Date of Patent: Jul. 2, 2019

(54) SYSTEMS AND METHODS FOR RENDERING EFFECTS IN 360 VIDEO

(71) Applicant: CyberLink Corp., Shindian, Taipei (TW)

(72) Inventors: Chun-Chia Su, Taipei (TW); Shan-Jan Weng, Taipei (TW)

(73) Assignee: CYBERLINK CORP., Shindian, Taipei (TW)

( * ) Notice: Subject to any disclaimer, the term of this patent is extended or adjusted under 35 U.S.C. 154(b) by 29 days.

(21) Appl. No.: 15/661,378

(22) Filed: Jul. 27, 2017

(65) Prior Publication Data

US 2018/0033176 A1    Feb. 1, 2018

Related U.S. Application Data

(60) Provisional application No. 62/367,716, filed on Jul. 28, 2016.

(51) Int. Cl.
| | |
|---|---|
| *G06T 11/60* | (2006.01) |
| *H04N 5/232* | (2006.01) |
| *G06F 3/0484* | (2013.01) |
| *G06T 3/00* | (2006.01) |
| *G06F 3/0481* | (2013.01) |

(Continued)

(52) U.S. Cl.
CPC .......... *G06T 11/60* (2013.01); *G06F 3/04815* (2013.01); *G06F 3/04845* (2013.01); *G06T 3/0062* (2013.01); *G06T 3/0093* (2013.01); *G06T 3/4038* (2013.01); *G06T 15/04* (2013.01); *G06T 15/503* (2013.01); *G11B 27/00* (2013.01);

(Continued)

(58) Field of Classification Search
CPC ..... G06T 11/60; G06T 15/503; G06T 3/4038; G06T 3/0062; G06T 15/04; G06T 3/0093; G11B 27/00; G06F 3/04815; G06F 3/04845; H04N 5/23238
USPC .......................................................... 348/36
See application file for complete search history.

(56) References Cited

U.S. PATENT DOCUMENTS

| | | |
|---|---|---|
| 7,483,590 B2 | 1/2009 | Nielsen et al. |
| 8,554,014 B2 | 10/2013 | Levy et al. |

(Continued)

FOREIGN PATENT DOCUMENTS

| | | |
|---|---|---|
| EP | 2685707 A1 | 1/2014 |
| WO | 2013020143 A1 | 2/2013 |

OTHER PUBLICATIONS

Niclas Bahn, "360VR Toolbox Public Beta Released" Sep. 12, 2015.

(Continued)

*Primary Examiner* — Marnie A Matt
(74) *Attorney, Agent, or Firm* — McClure, Qualey & Rodack, LLP

(57) ABSTRACT

A computing device for inserting an effect into a 360 video receives the effect from a user. A target region is also received from the user, where the target region corresponds to a location within the 360 video for inserting the effect. Next, the following steps are performed for each frame in the 360 video. The effect is inserted on a surface of a spherical model based on the target region, and two half-sphere frames containing the effect from the spherical model are generated. The two half-sphere frames are stitched to generate a panoramic representation of the effect, and the (Continued)

panoramic representation of the effect is blended with an original source panorama to generate a modified 360 video frame with the effect.

18 Claims, 19 Drawing Sheets

(51) Int. Cl.
    *G06T 15/04*     (2011.01)
    *G06T 3/40*     (2006.01)
    *G11B 27/00*     (2006.01)
    *G06T 15/50*     (2011.01)
    *H04N 5/272*     (2006.01)

(52) U.S. Cl.
    CPC ....... *H04N 5/23238* (2013.01); *H04N 5/2723* (2013.01)

(56) References Cited

U.S. PATENT DOCUMENTS

| | | | |
|---|---|---|---|
| 8,717,412 B2 | 5/2014 | Linder et al. | |
| 9,071,752 B2 | 6/2015 | Kuo et al. | |
| 9,124,867 B2 | 9/2015 | Furumura et al. | |
| 9,135,678 B2 | 9/2015 | Feng et al. | |
| 9,277,122 B1 | 3/2016 | Imura et al. | |
| 10,127,632 B1* | 11/2018 | Burke | G06T 3/4038 |
| 10,127,714 B1* | 11/2018 | Kvaalen | G06T 15/205 |
| 2009/0021576 A1* | 1/2009 | Linder | G03B 37/00 |
| | | | 348/36 |
| 2010/0045773 A1 | 2/2010 | Ritchey | |
| 2013/0044108 A1* | 2/2013 | Tanaka | G06T 15/04 |
| | | | 345/419 |
| 2013/0063550 A1* | 3/2013 | Ritchey | G16H 40/63 |
| | | | 348/36 |
| 2014/0267596 A1 | 9/2014 | Geerds | |
| 2017/0336705 A1* | 11/2017 | Zhou | G06T 3/0062 |
| 2017/0339391 A1* | 11/2017 | Zhou | H04L 65/604 |
| 2017/0366748 A1* | 12/2017 | Festa | H04N 5/23238 |
| 2018/0211443 A1* | 7/2018 | Abbas | G06T 19/003 |

OTHER PUBLICATIONS

HDR Panoramas with PTGui Pro, https://www.ptgui.com/hdrtutorial.html (Printed on Jul. 21, 2017).
Spherical Panorama, https://www.ptgui.com/info/spherical_panorama.html (Printed on Jul. 21, 2017).
HDR Workflow with Hugin, http://hugin.sourceforge.net/docs/manual/HDR_workflow_with_hugin.html (Printed on Jul. 21, 2017).

* cited by examiner

SYSTEMS AND METHODS FOR RENDERING EFFECTS IN 360 VIDEO

CROSS-REFERENCE TO RELATED APPLICATION

This application claims priority to, and the benefit of, U.S. Provisional patent application entitled, "Systems and Methods for Adjusting Directional Audio in a 360 Video," having Ser. No. 62/367,716, filed on Jul. 28, 2016, which is incorporated by reference in its entirety.

TECHNICAL FIELD

The present disclosure generally relates to video processing and more particularly, to systems and methods for rendering effects in 360 video.

BACKGROUND

As smartphones and other mobile devices have become ubiquitous, people have the ability to capture video virtually anytime. Furthermore, 360 videos have gained increasing popularity.

SUMMARY

In a first embodiment, a computing device for inserting an effect into a 360 video receives the effect from a user. A target region is also received from the user, where the target region corresponds to a location within the 360 video for inserting the effect. Next, the following steps are performed for each frame in the 360 video. The effect is inserted on a surface of a spherical model based on the target region, and two half-sphere frames or several projection frames containing the effect from the spherical model are generated. The two half-sphere frames or the projection frames are stitched to generate a panoramic representation of the effect, and the panoramic representation of the effect is blended with an original source panorama to generate a modified 360 video frame with the effect.

Another embodiment is a system that comprises a memory storing instructions and a processor coupled to the memory. The processor is configured by the instructions to receive the effect from a user and receive a target region from the user, the target region corresponding to a location within the 360 video for inserting the effect. The processor is further configured to perform the following steps for each frame in the 360 video. The effect is inserted on a surface of a spherical model based on the target region, and two half-sphere or the projection frames containing the effect from the spherical model are generated. The two half-sphere frames or the projection frames are stitched to generate a panoramic representation of the effect, and the panoramic representation of the effect is blended with an original source panorama to generate a modified 360 video frame with the effect.

Another embodiment is a non-transitory computer-readable storage medium storing instructions to be implemented by a computing device having a processor. The instructions, when executed by the processor, cause the computing device to receive the effect from a user and receive a target region from the user, the target region corresponding to a location within the 360 video for inserting the effect. The computing device is further configured to perform the following steps for each frame in the 360 video. The effect is inserted on a surface of a spherical model based on the target region, and two half-sphere frames or the projection frames containing the effect from the spherical model are generated. The two half-sphere frames or the projection frames are stitched to generate a panoramic representation of the effect, and the panoramic representation of the effect is blended with an original source panorama to generate a modified 360 video frame with the effect.

BRIEF DESCRIPTION OF THE DRAWINGS

Various aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

An increasing number of digital capture devices are equipped with the ability to record 360 degree video (hereinafter "360 video"), which offers viewers a fully immersive experience. The creation of 360 video generally involves capturing a full 360 degree view using multiple cameras, stitching the captured views together, and encoding the video. With the increasing popularity of 360 degree videos, users may wish to incorporate graphics (e.g., a sticker), text, a picture-in-picture (PiP) effect, image, and/or other customized effects to further enhance 360 videos.

Various embodiments are disclosed for systems and methods for incorporating effects into a 360 video. Specifically, different techniques are disclosed for incorporating effects into a 360 video on a frame-by-frame basis, where an effect panorama frame containing the effect is generated and the effect panorama frame is then merged with the original source panorama frame to generate an edited frame. This process is repeated for each frame in the 360 video.

Figure 1:
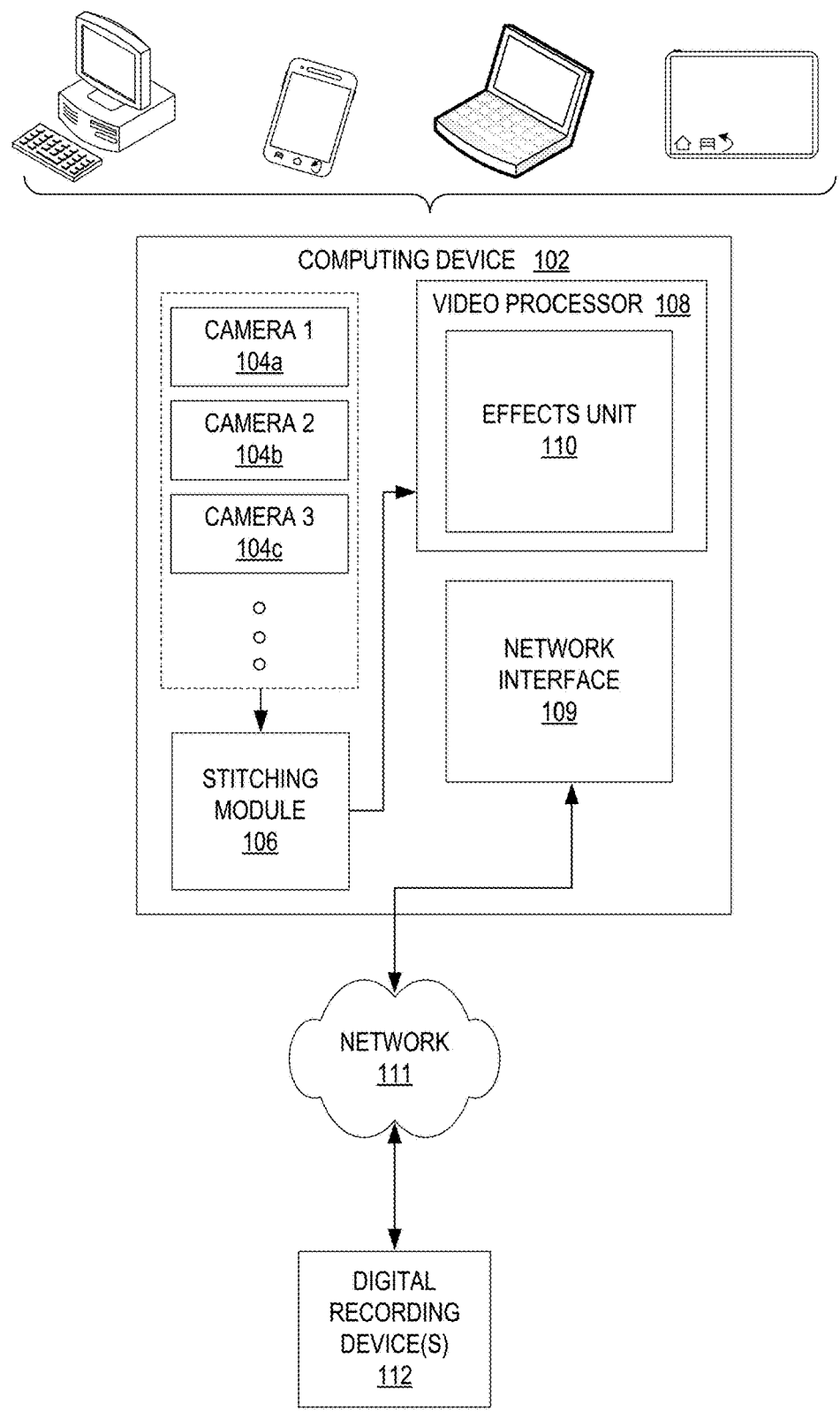
FIG. 1 is a block diagram of a computing device in which the disclosed effects editing techniques may be implemented in accordance with various embodiments.

A description of a system for implementing the disclosed editing techniques is now described followed by a discussion of the operation of the components within the system. FIG. 1 is a block diagram of a computing device 102 in which the various effects editing techniques disclosed herein may be implemented. The computing device 102 may be equipped with digital content recording capabilities, where the computing device 102 may be embodied as, for example, a digital camera, a smartphone, a tablet computing device, a digital video recorder, a laptop computer coupled to a webcam, and so on.

For some embodiments, the computing device 102 may be equipped with a plurality of cameras 104a, 104b, 104c where the cameras 104a, 104b, 104c are utilized to capture digital media content comprising 360 degree views. In accordance with such embodiments, the computing device 102 further comprises a stitching module 106 configured to process the 360 degree views. Alternatively, the computing device 102 may obtain 360 video from other digital recording devices 112 coupled to the computing device 102 through a network interface 109 over a network 111.

As one of ordinary skill will appreciate, the digital media content may be encoded in any of a number of formats including, but not limited to, Motion Picture Experts Group (MPEG)-1, MPEG-2, MPEG-4, H.264, Third Generation Partnership Project (3GPP), 3GPP-2, Standard-Definition Video (SD-Video), High-Definition Video (HD-Video), Digital Versatile Disc (DVD) multimedia, Video Compact Disc (VCD) multimedia, High-Definition Digital Versatile Disc (HD-DVD) multimedia, Digital Television Video/ High-definition Digital Television (DTV/HDTV) multimedia, Audio Video Interleave (AVI), Digital Video (DV), QuickTime (QT) file, Windows Media Video (WMV), Advanced System Format (ASF), Real Media (RM), Flash Media (FLV), an MPEG Audio Layer III (MP3), an MPEG Audio Layer II (MP2), Waveform Audio Format (WAV), Windows Media Audio (WMA), or any number of other digital formats.

A video processor 108 executes on a processor of the computing device 102 and configures the processor to perform various operations relating to the coding of 360 video. The video processor 108 includes an effects unit 110 configured to incorporate effects into 360 videos according to various effects editing techniques, where the effects unit incorporates effects into a 360 video on a frame-by-frame basis. Specifically, the effects unit 110 generates an effect panorama frame containing the effect and then merges the effect panorama frame the original source panorama frame to generate an edited frame, as described in more detail below. This process is repeated for each frame in the 360 video.

Figure 2:
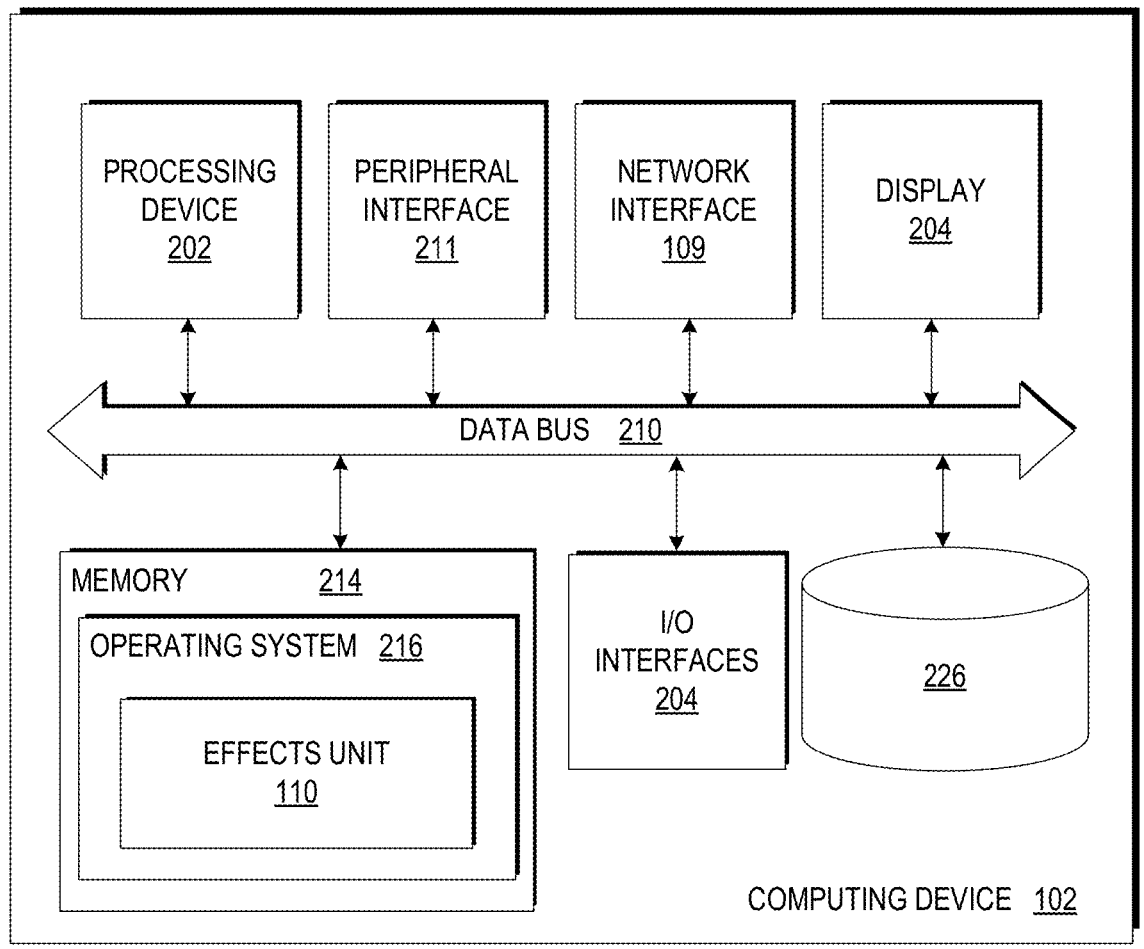
FIG. 2 illustrates a schematic block diagram of the computing device in FIG. 1 in accordance with various embodiments.

FIG. 2 illustrates a schematic block diagram of the computing device 102 in FIG. 1. The computing device 102 may be embodied in any one of a wide variety of wired and/or wireless computing device 102s, such as a desktop computer, portable computer, dedicated server computer, multiprocessor computing device, smart phone, tablet, and so forth. As shown in FIG. 2, each of the computing device 102 comprises memory 214, a processing device 202, a number of input/output interfaces 204, a network interface 109, a display 204, a peripheral interface 211, and mass storage 226, wherein each of these components are connected across a local data bus 210.

The processing device 202 may include any custom made or commercially available processor, a central processing unit (CPU) or an auxiliary processor among several processors associated with the computing device 102, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 214 can include any one of a combination of volatile memory elements (e.g., random-access memory (RAM, such as DRAM, and SRAM, etc.)) and nonvolatile memory elements (e.g., ROM, hard drive, tape, CDROM, etc.). The memory 214 typically comprises a native operating system 216, one or more native applications, emulation systems, or emulated applications for any of a variety of operating systems and/or emulated hardware platforms, emulated operating systems, etc. For example, the applications may include application specific software which may comprise some or all the components of the computing device 102 depicted in FIG. 1. In accordance with such embodiments, the components are stored in memory 214 and executed by the processing device 202. One of ordinary skill in the art will appreciate that the memory 214 can, and typically will, comprise other components which have been omitted for purposes of brevity.

Input/output interfaces 204 provide any number of interfaces for the input and output of data. For example, where the computing device 102 comprises a personal computer, these components may interface with one or more user input/output interfaces 204, which may comprise a keyboard or a mouse, as shown in FIG. 2. The display 104 may comprise a computer monitor, a plasma screen for a PC, a liquid crystal display (LCD) on a hand held device, a touchscreen, or other display device.

In the context of this disclosure, a non-transitory computer-readable storage medium stores programs for use by or in connection with an instruction execution system, apparatus, or device. More specific examples of a computer-readable storage medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical).

Figure 3:
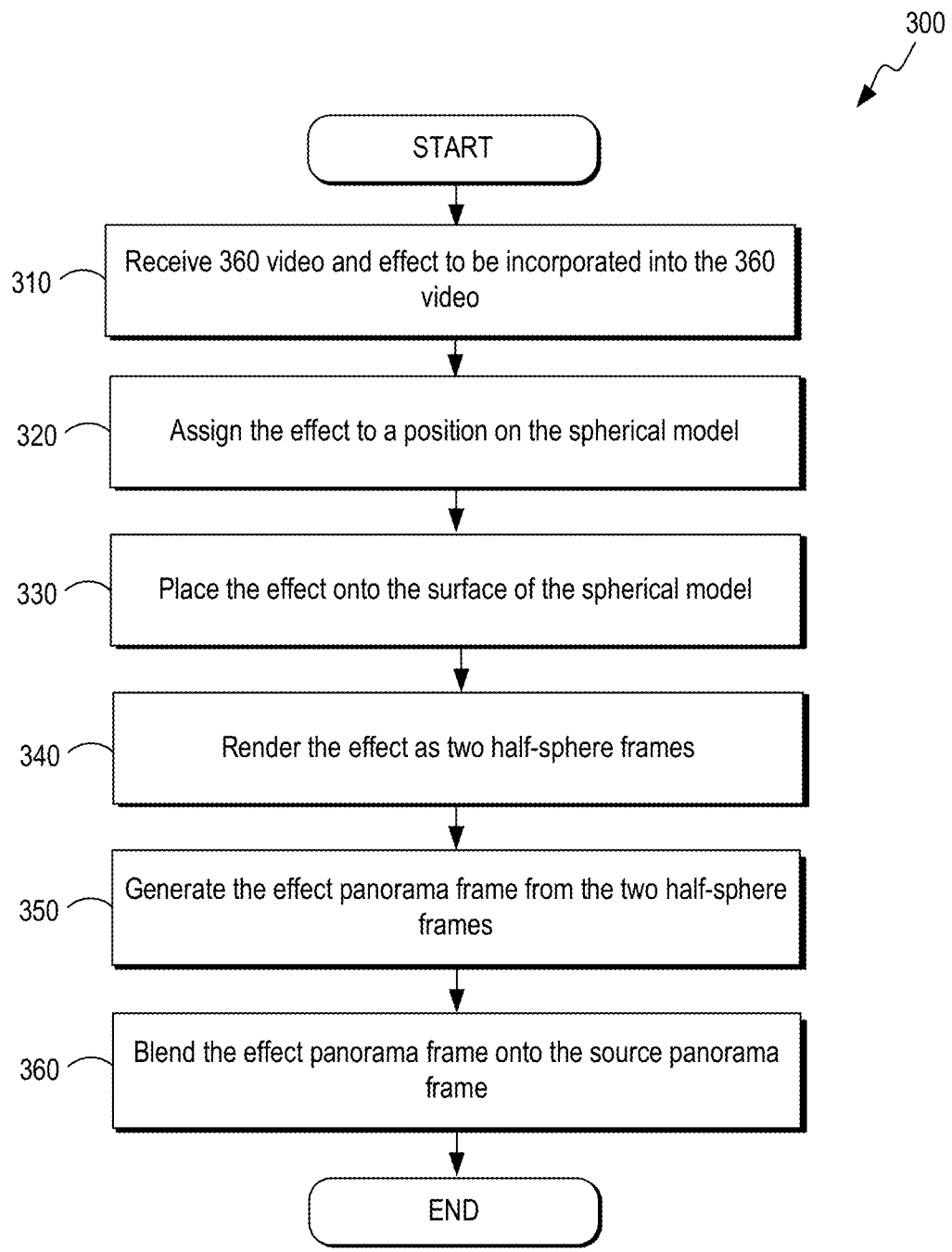
FIG. 3 is a flowchart for a first technique for incorporating effects into 360 video utilizing the computing device of FIG. 1 in accordance with various embodiments.

Reference is made to FIG. 3, which is a flowchart 300 in accordance with a first embodiment for incorporating effects into a 360 video performed by the effects unit 110 in the computing device 102 of FIG. 1. It is understood that the flowchart 300 of FIG. 3 provides merely an example of the different types of functional arrangements that may be employed to implement the operation of the various components of the computing device 102. As an alternative, the flowchart 300 of FIG. 3 may be viewed as depicting an example of steps of a method implemented in the computing device 102 according to one or more embodiments.

Although the flowchart 300 of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. It is understood that all such variations are within the scope of the present disclosure.

To begin, in block 310, the effects unit 110 receives a 360 video in addition to an effect to be incorporated into the 360 video. The effect may include, but is not limited to, graphics to be inserted into the 360 video, text, image, or PiP to be inserted onto or around objects in the 360 video, and so on. In block 320, the effects unit 110 positions the effect on a spherical representation corresponding to the 360 video, where the position is specified by the user. In this implementation, the position specified by the user corresponds to a desired location within the 360 video (i.e., a target region). Thus, the effect may be positioned directly at the target location on the spherical depiction of the 360 video. As described in more detail below, the user may specify the desired position on either the spherical representation or on a two-dimensional (2D) panorama frame. The user may also set the size of the target region.

In block 330, the effects unit 110 places the effect into the target region of the spherical representation. In block 340, the effects unit 110 then renders the effect by setting camera positions on opposite sides of the spherical representation with the desired effect applied to the model. Two half-sphere frames containing the effect are then generated. The projection model of the camera may be adjusted to obtain the entire content of the half-sphere frames.

In block 350, an effect panorama frame containing the effect is generated by applying a stitching technique to merge the two half-sphere frames into a single panorama frame. This may comprise first warping the two half-sphere frames into two square frames and then stitching or merging the two square frames into a single effect panorama frame.

Figure 4:
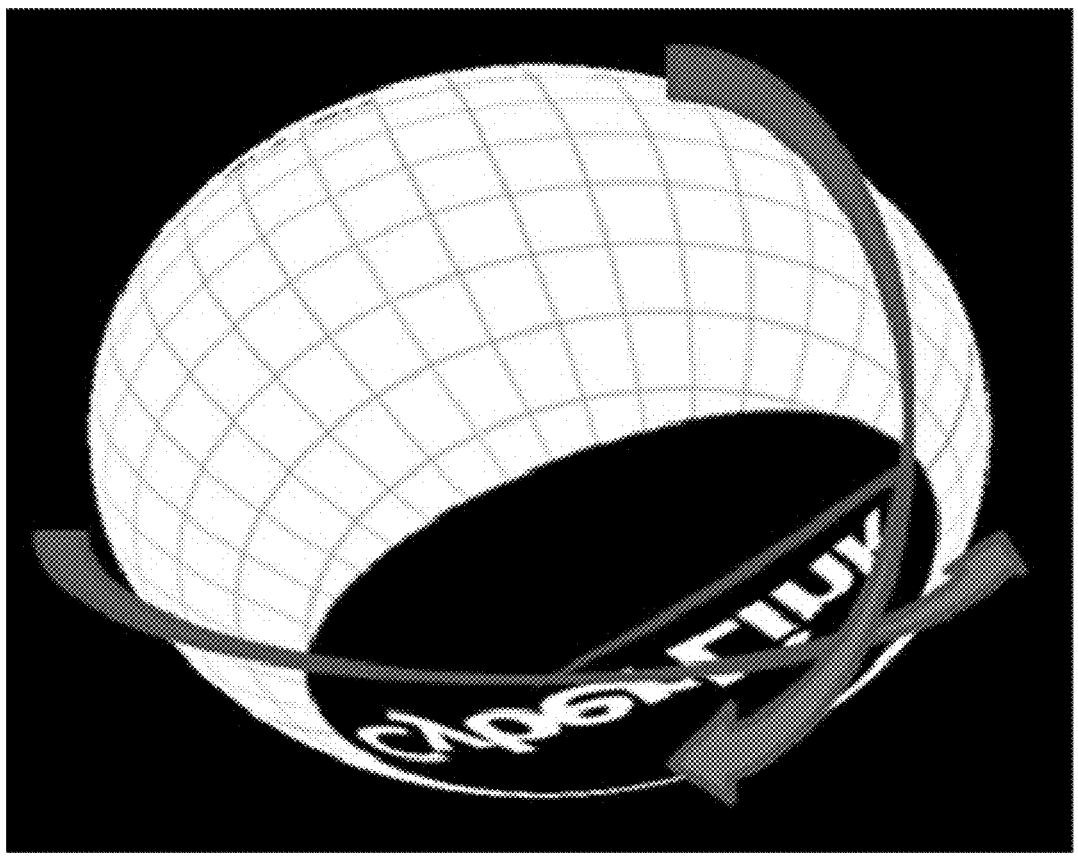
FIG. 4 illustrates placement of the desired effect to a position in a front view of the spherical representation in accordance with various embodiments.

Additional details regarding various steps in the flowchart of FIG. 3 are now disclosed. FIG. 4 illustrates placement of the desired effect to a position in a front view of the spherical representation in accordance with various embodiments. As discussed above in connection with block 320, the desired location of the effect is obtained for placement of the effect on a 2D view of the 360 video. In some implementations, the desired effect is first positioned in a front view of the spherical representation, as shown in FIG. 4. The user may then rotate the spherical representation (while the desired effect remains static) until the desired effect is aligned with the desired location within the spherical representation for the effect. The user may also scale the size of the desired effect on the spherical representation by adjusting the size of the target region using a mouse, touchscreen interface, or other suitable means.

Figure 5:
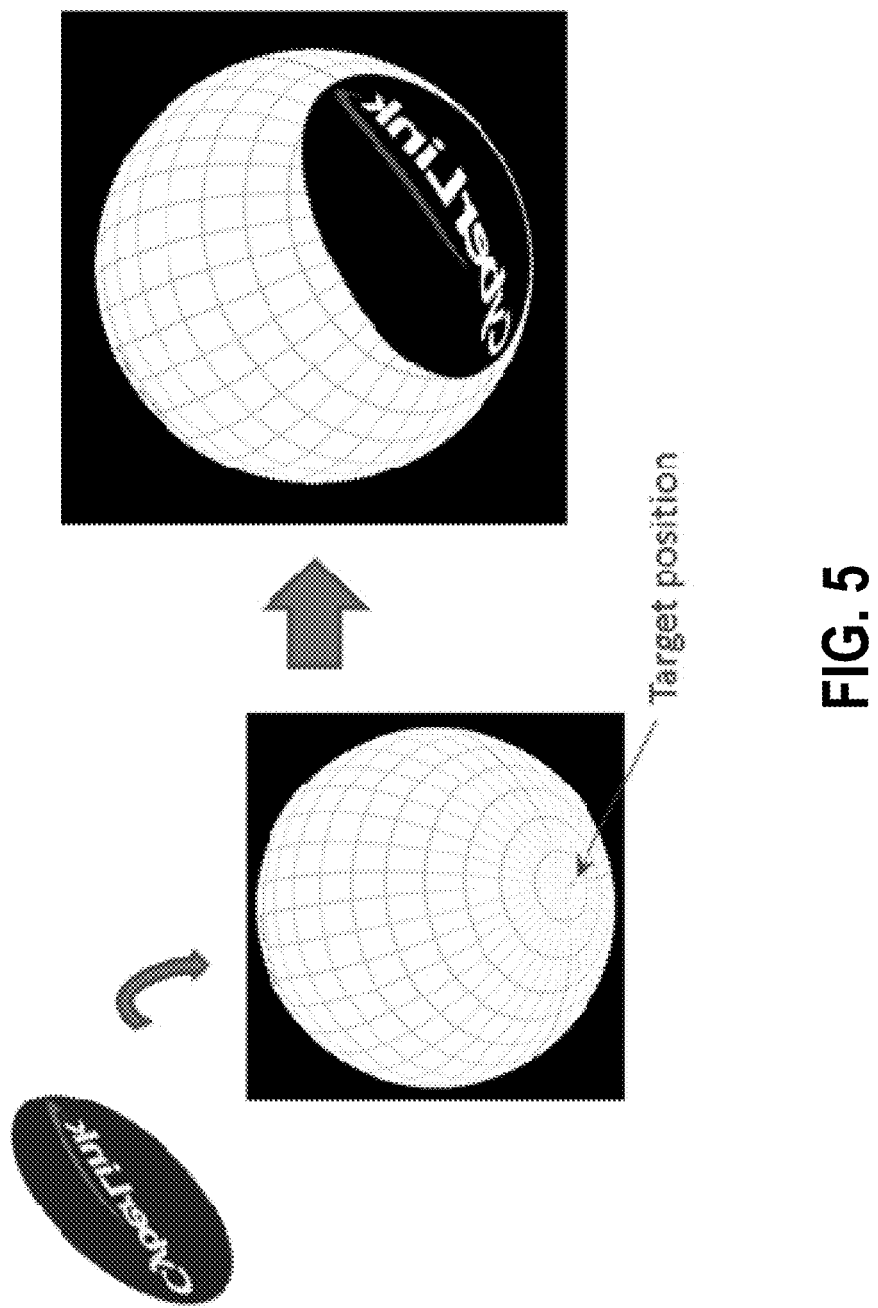
FIG. 5 illustrates placement of the effect into the target region of the spherical representation using 3D modeling and texture mapping in accordance with various embodiments.

FIG. 5 illustrates placement of the effect into the target region of the spherical representation using 3D modeling and texture mapping in accordance with various embodiments. As discussed above in connection with block 330, the effects unit 110 places the effect into the target region of the spherical representation. As shown in FIG. 5, this operation may be accomplished using 3D modeling and texture mapping techniques for inserting a 2D effect onto a 3D spherical surface. For some embodiments, a polygon mesh comprising a series of smaller polygons is generated for the surface region. The desired effect (e.g., graphic) is then applied to the target region as texture for the polygons of the polygon mesh.

Figure 6:
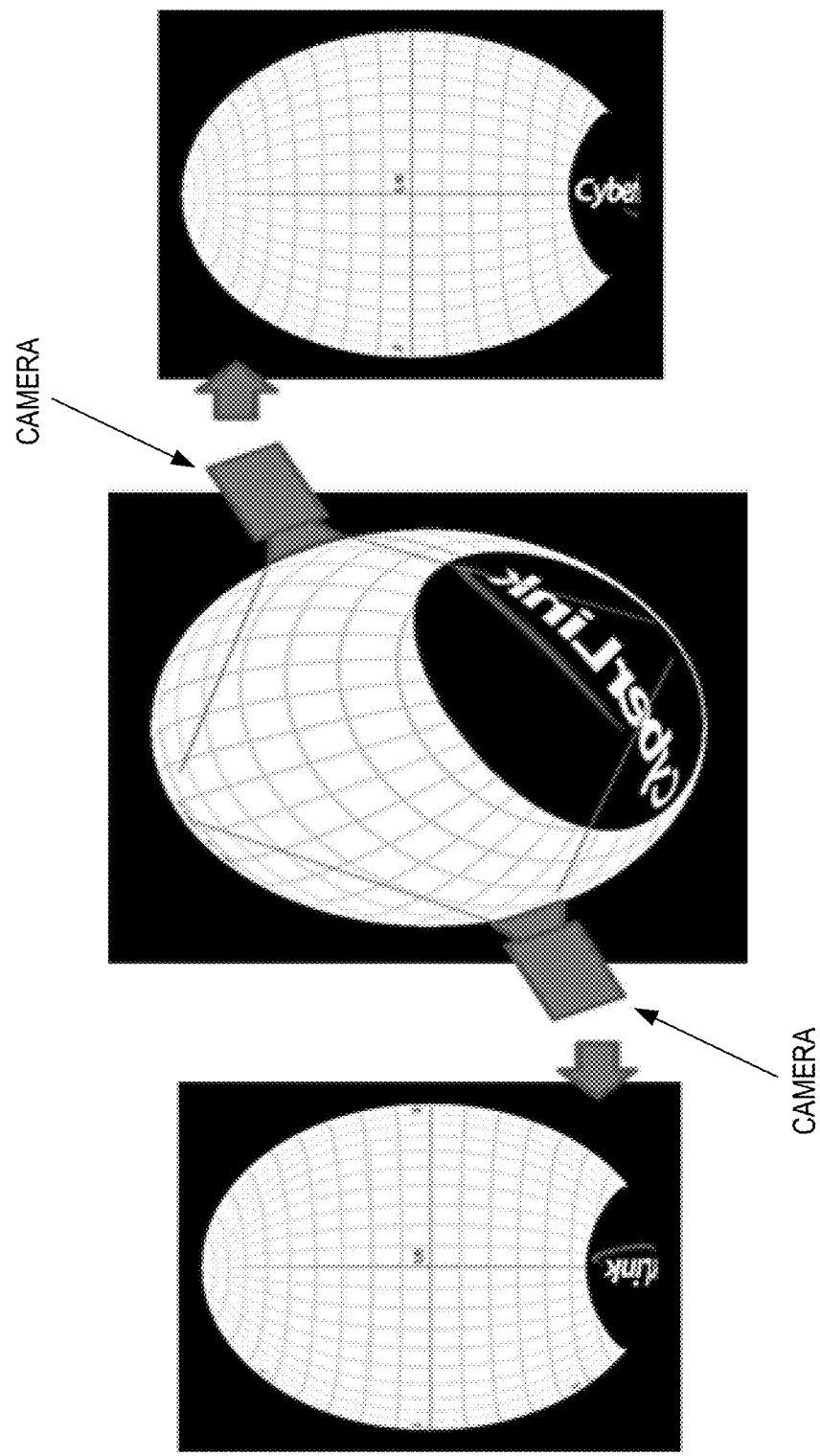
FIG. 6 illustrates the rendering operation where camera positions are set on opposite sides of the spherical representation with the desired effect applied to the model in accordance with various embodiments.

FIG. 6 illustrates a rendering operation in accordance with various embodiments. As discussed above in connection with block 340, the effects unit 110 renders the effect by setting camera positions on opposite sides of the spherical representation with the desired effect applied to the model, as shown in FIG. 6. Two half-sphere frames containing the effect are rendered based on the cameras settings.

Figure 7:
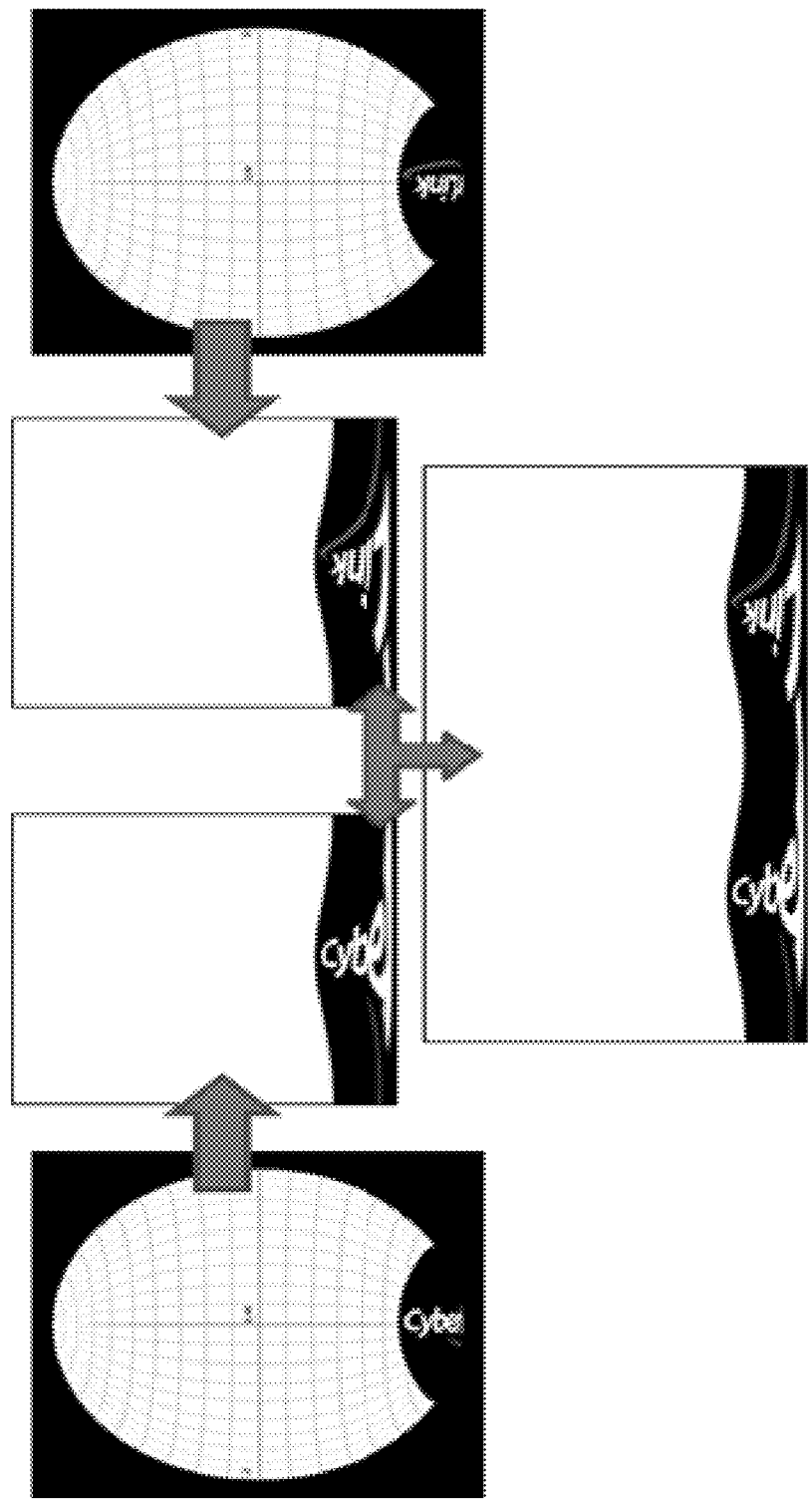
FIG. 7 illustrates generation of the effect panorama frame by application of a stitching technique to merge the two half-sphere frames into a single panorama frame in accordance with various embodiments.

FIG. 7 illustrates generation of the effect panorama frame by application of a stitching technique in accordance with various embodiments. As discussed above in connection with block 350, an effect panorama frame containing the effect is generated by applying a stitching technique to merge the two half-sphere frames into a single panorama frame, as shown in FIG. 7. This may comprise first warping the two half-sphere frames into two square frames and then stitching or merging the two square frames into a single effect panorama frame. Note that the stitching/merging operation may be performed by the CPU or GPU of the computing device 102. To warp the two half-sphere frames into two square frames, the effects unit 110 can apply spherical-to-cylindrical coordinate transformation, where the transformation can be computed from parameters of the spherical representation and from the camera settings.

Figure 15:
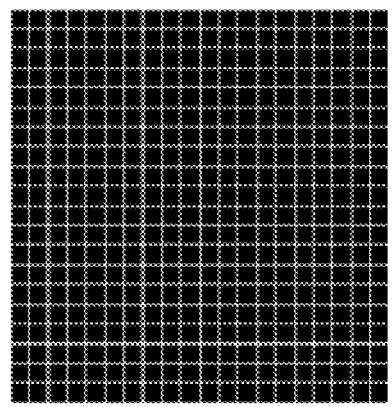
FIG. 15 illustrates how cylindrical coordinate transformation is applied to warp the half-spheres to equirectangular frames in accordance with various embodiments.
Figure 15:
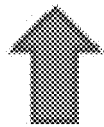
Figure 15:
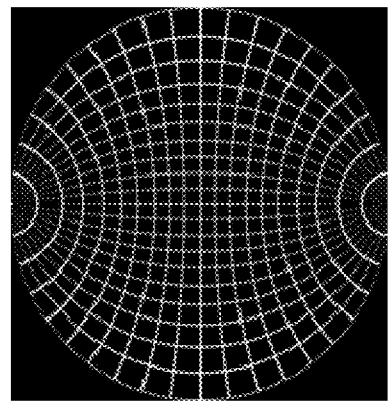
Figure 16:
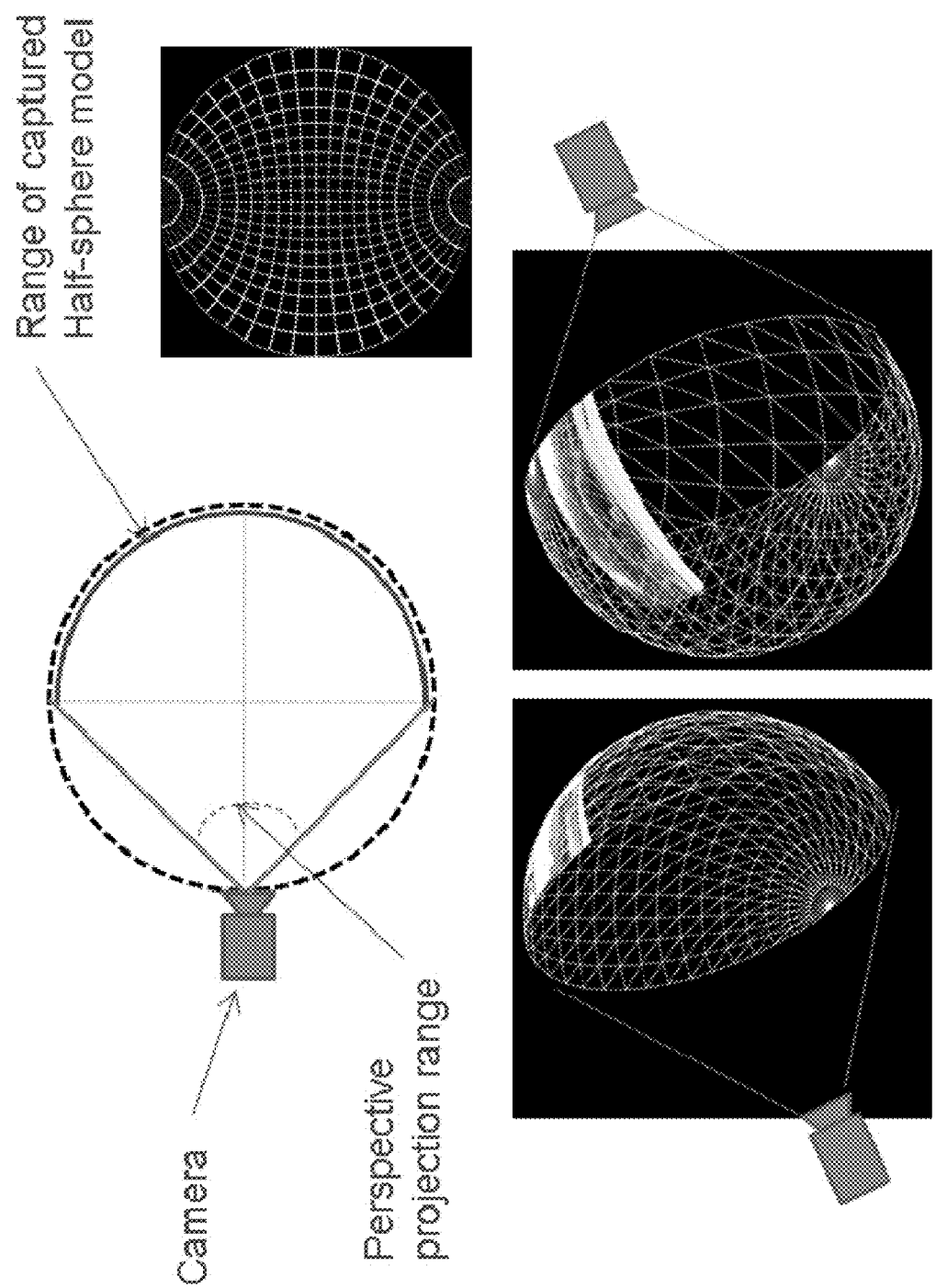
FIG. 16 illustrates how the cameras capture a left half-sphere and a right half-sphere in accordance with various embodiments.

To further illustrate, reference is made to FIG. 15, where spherical-to-cylindrical coordinate transformation is applied to warp the half-spheres to equirectangular frames. In some embodiments, the camera is placed on one side of the spherical surface in order to capture the frame of the other side of the half-sphere model, as shown in FIG. 16. That is, as illustrated in FIG. 16, the camera captures the right half-sphere when the camera is on the left side. Similarly, the camera captures the left half-sphere when the camera is on the right side. Perspective projection is then used to ensure better quality of the outer parts of themes.

Figure 8:
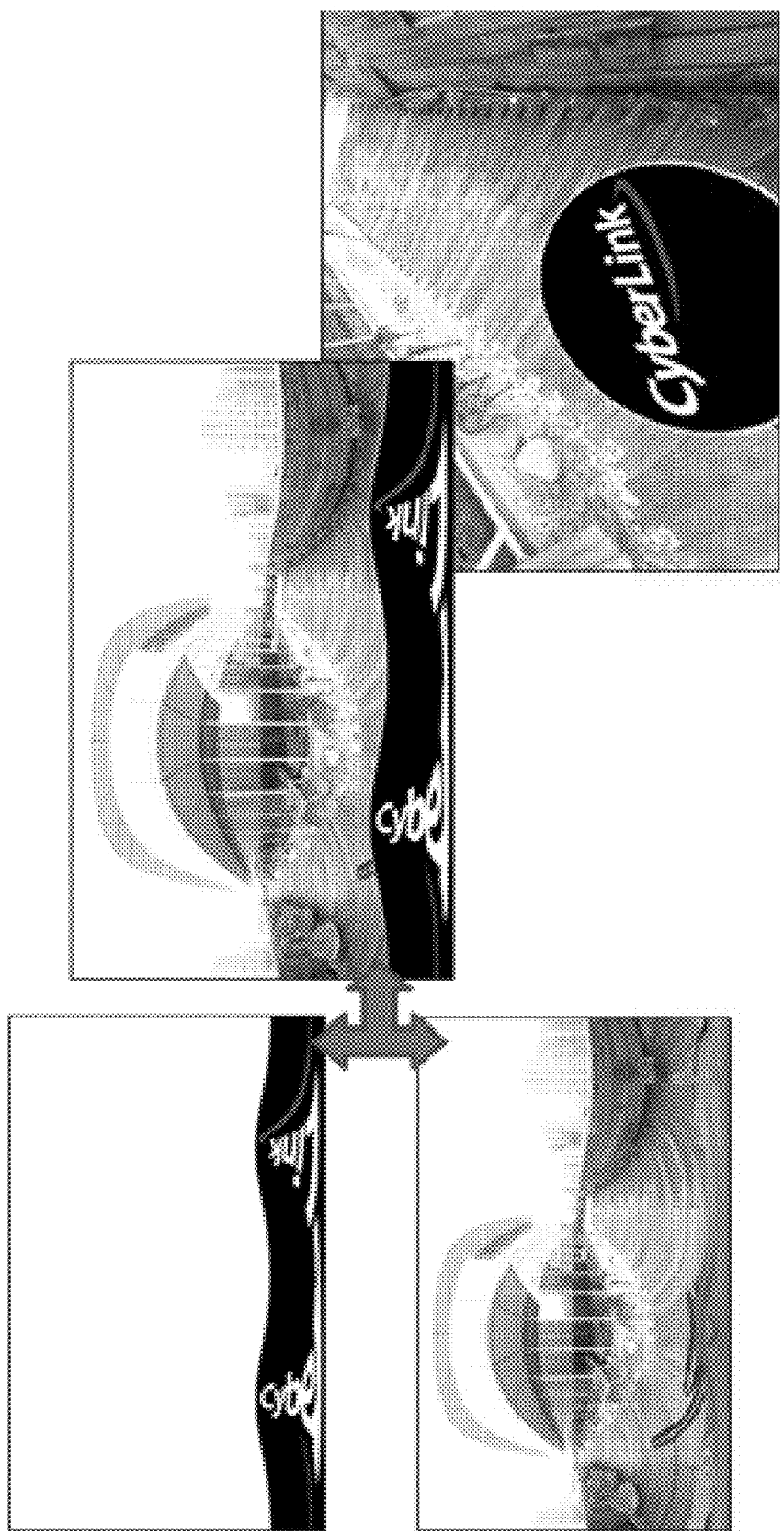
FIG. 8 illustrates blending of the panorama frame with the effect with the original source panorama frame to generate an effect-applied panorama frame in accordance with various embodiments.

FIG. 8 illustrates blending of the panorama frame with the effect with the original source panorama frame in accordance with various embodiments. As discussed above in connection with block 360, the effect panorama frame is blended onto the source panorama frame. As shown in FIG. 8, the panorama frame containing the effect is blended with the original source panorama frame to generate an edited panorama frame of the 360 video with the effect incorporated.

Figure 9:
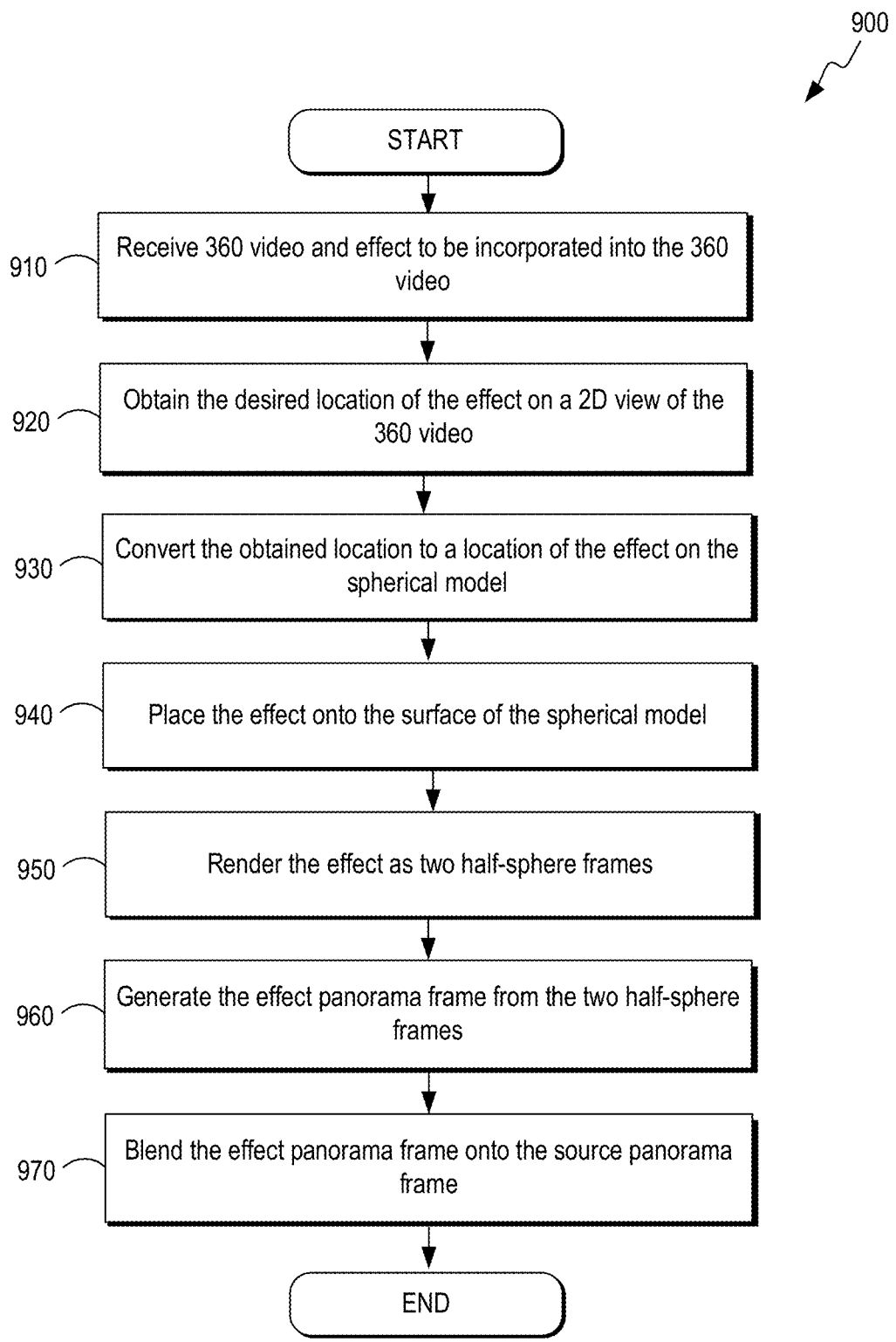
FIG. 9 is a flowchart for a second technique for incorporating effects into 360 video utilizing the computing device of FIG. 1 in accordance with various embodiments.

Reference is made to FIG. 9, which is a flowchart 900 in accordance with another embodiment for incorporating effects into a 360 video performed by the effects unit 110 in the computing device 102 of FIG. 1. It is understood that the flowchart 900 of FIG. 9 provides merely an example of the different types of functional arrangements that may be employed to implement the operation of the various components of the computing device 102. As an alternative, the flowchart 900 of FIG. 9 may be viewed as depicting an example of steps of a method implemented in the computing device 102 according to one or more embodiments.

Although the flowchart 900 of FIG. 9 shows a specific order of execution, it is understood that the order of execution may differ from that which is depicted. For example, the order of execution of two or more blocks may be scrambled relative to the order shown. Also, two or more blocks shown in succession in FIG. 9 may be executed concurrently or with partial concurrence. It is understood that all such variations are within the scope of the present disclosure.

To begin, in block 910, the effects unit 110 receives a 360 video in addition to an effect to be incorporated into the 360 video. In block 920, the effects unit 110 obtains the desired location of the effect on a 2D view of the 360 video. In block 930, the obtained location is converted to a location of the effect on the spherical representation, and the effect is placed onto the surface of the spherical representation (block 940).

In block 950, the effects unit 110 then renders the effect as two half-sphere frames and generates an effect panorama frame from the two half-sphere frames (block 960). In block 970, the effect panorama frame is then blended or merged with the original source panorama frame. Thereafter, the process in FIG. 9 ends.

Figure 10:
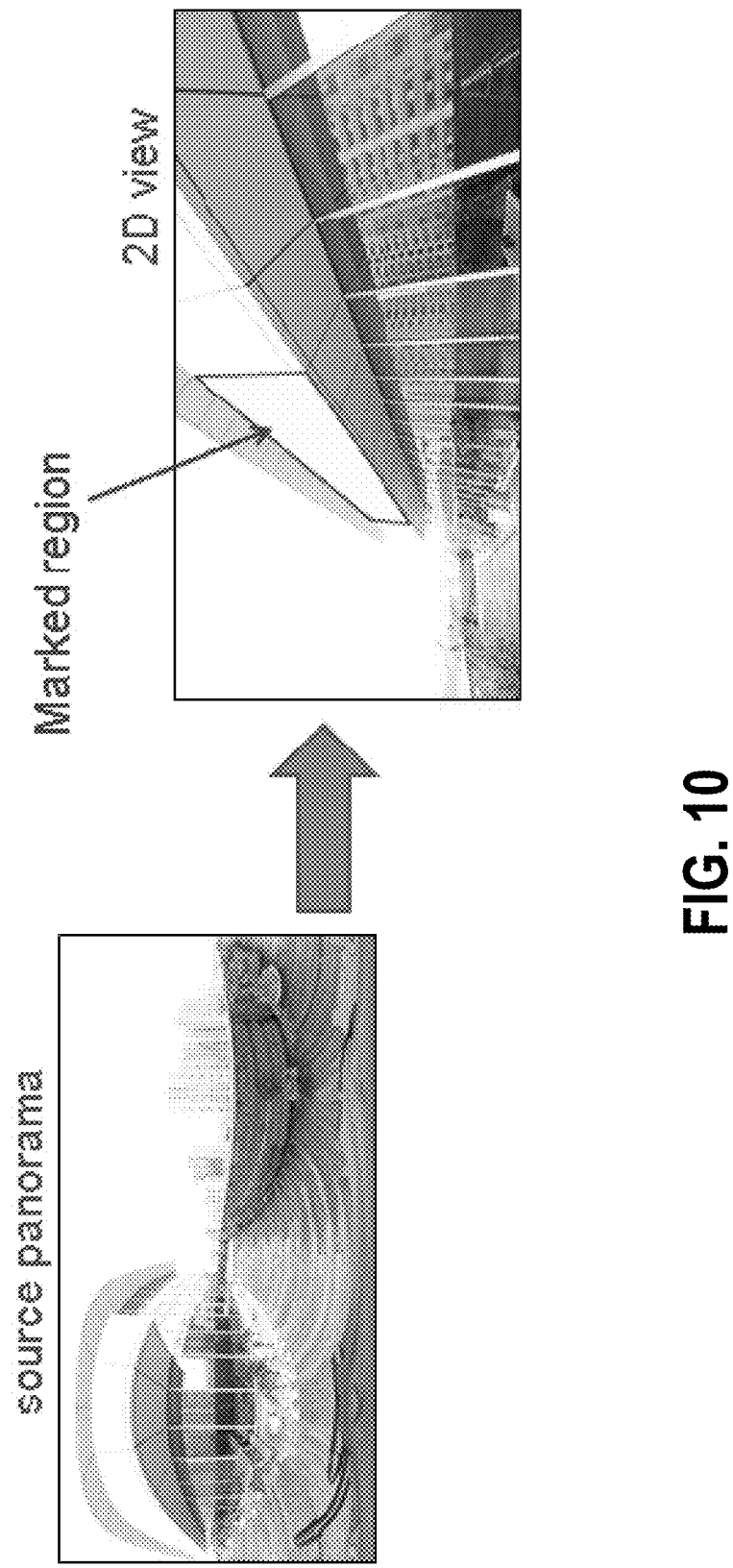
FIG. 10 illustrates how a target region within a 360 video is obtained in accordance with various embodiments.

Additional details for the various operations in FIG. 9 are now provided. FIG. 10 illustrates how a target region within a 360 video is obtained, where the target region corresponds to where the effect will be incorporated. In the example shown, a 2D view is generated from the source panorama frame, thereby allowing a user to mark a target region. The target region may be specified using a mouse, a touchscreen interface, or other suitable means. For example, the user may specify the target region shown in FIG. 10 by selecting or defining the 4 corners of the rectangular region in the 2D view. The effects unit 110 then breaks the region into small polygons, and maps the position of the corner points (vertices) of each polygon within the 2D view back to the spherical coordinates. For some embodiments, rectilinear projection is utilized for rendering the 2D view, where inverse projection is then utilized to convert the coordinates of the polygon points (vertices) to spherical coordinates. Upon conversion of the polygon points (vertices) to spherical coordinates, a region within the spherical representation defined by a set of polygons is identified.

Figure 11:
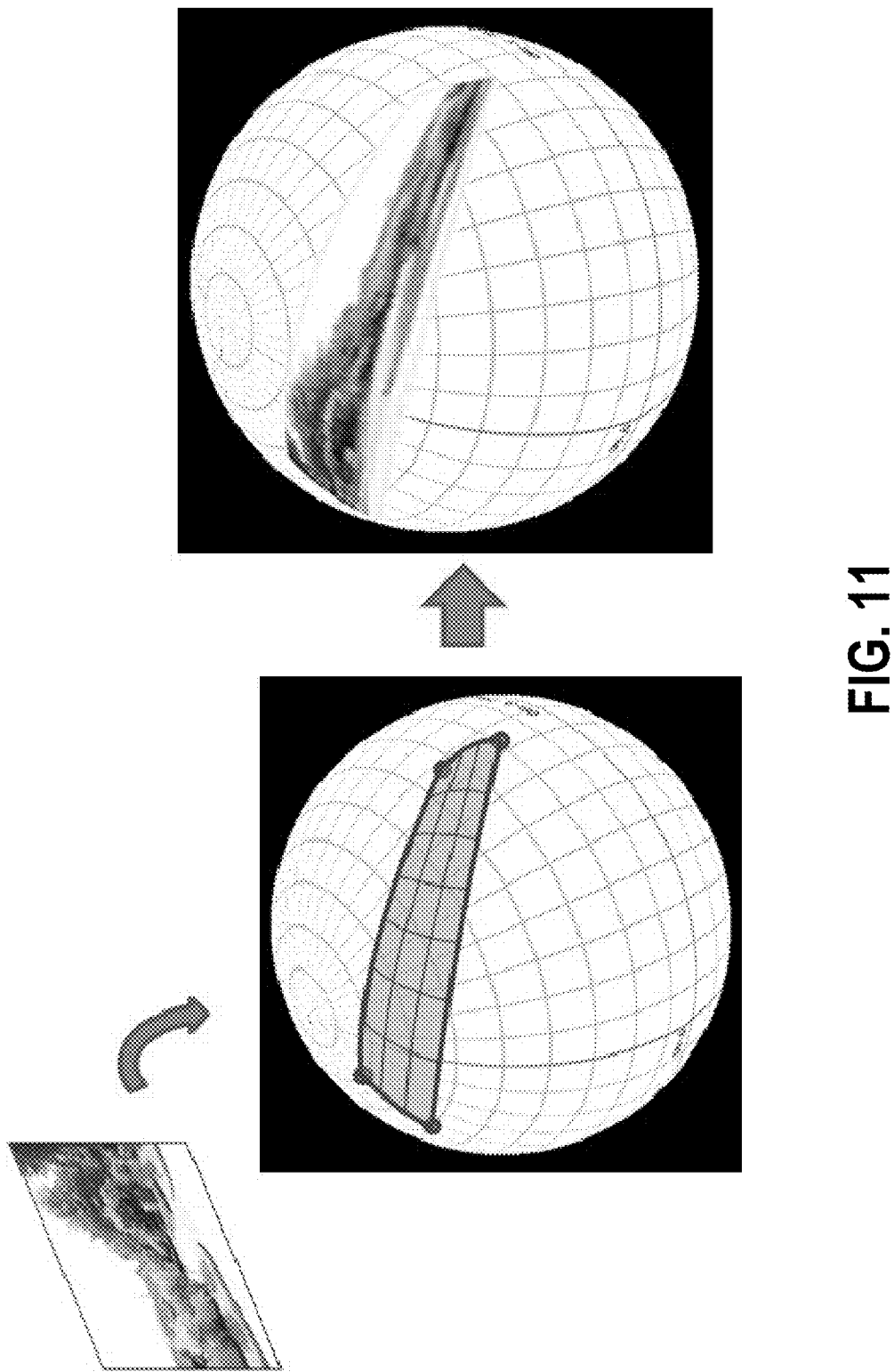
FIG. 11 illustrates how a polygon mesh comprising a series of smaller polygons is generated for the surface region and how the desired effect is then applied to the target region as texture for the polygons of the polygon mesh in accordance with various embodiments.

Next, 3D modeling and texture mapping techniques are applied for placing the desired effect onto the 3D spherical surface. Reference is made to FIG. 11. For some embodiments, a polygon mesh comprising a series of smaller polygons is generated for the surface region. The desired effect (e.g., graphic) is then applied to the target region as texture for the polygons of the polygon mesh.

Figure 12:
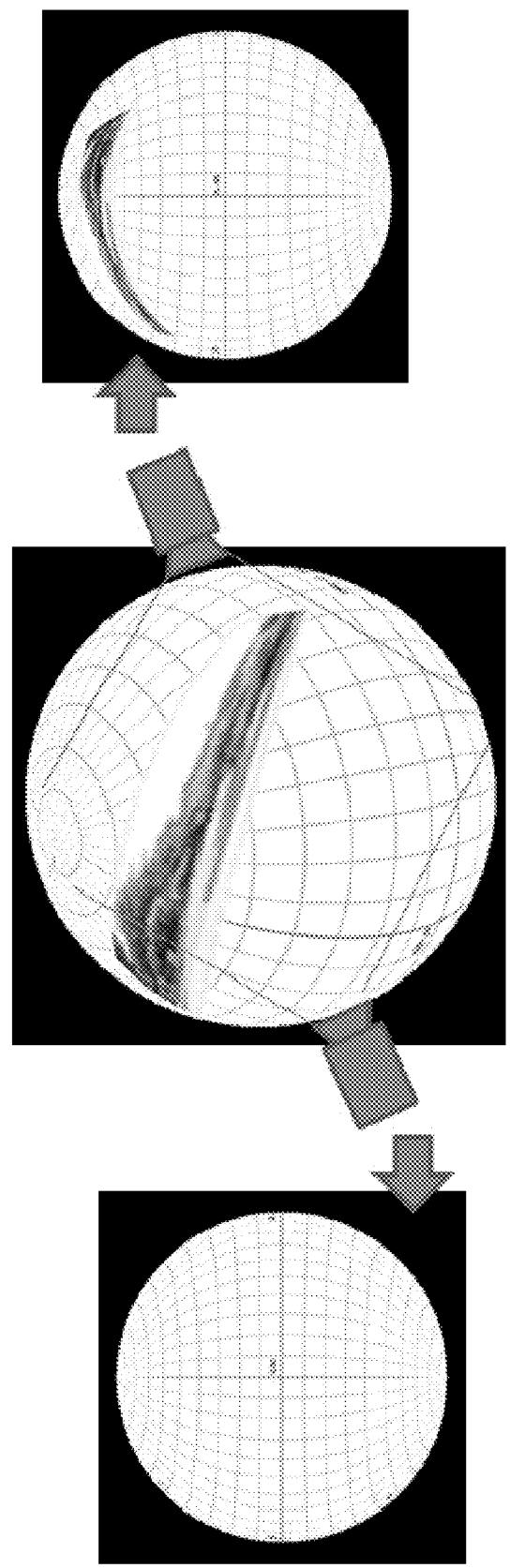
FIG. 12 illustrates generation of half-sphere frames in accordance with various embodiments.
Figure 13:
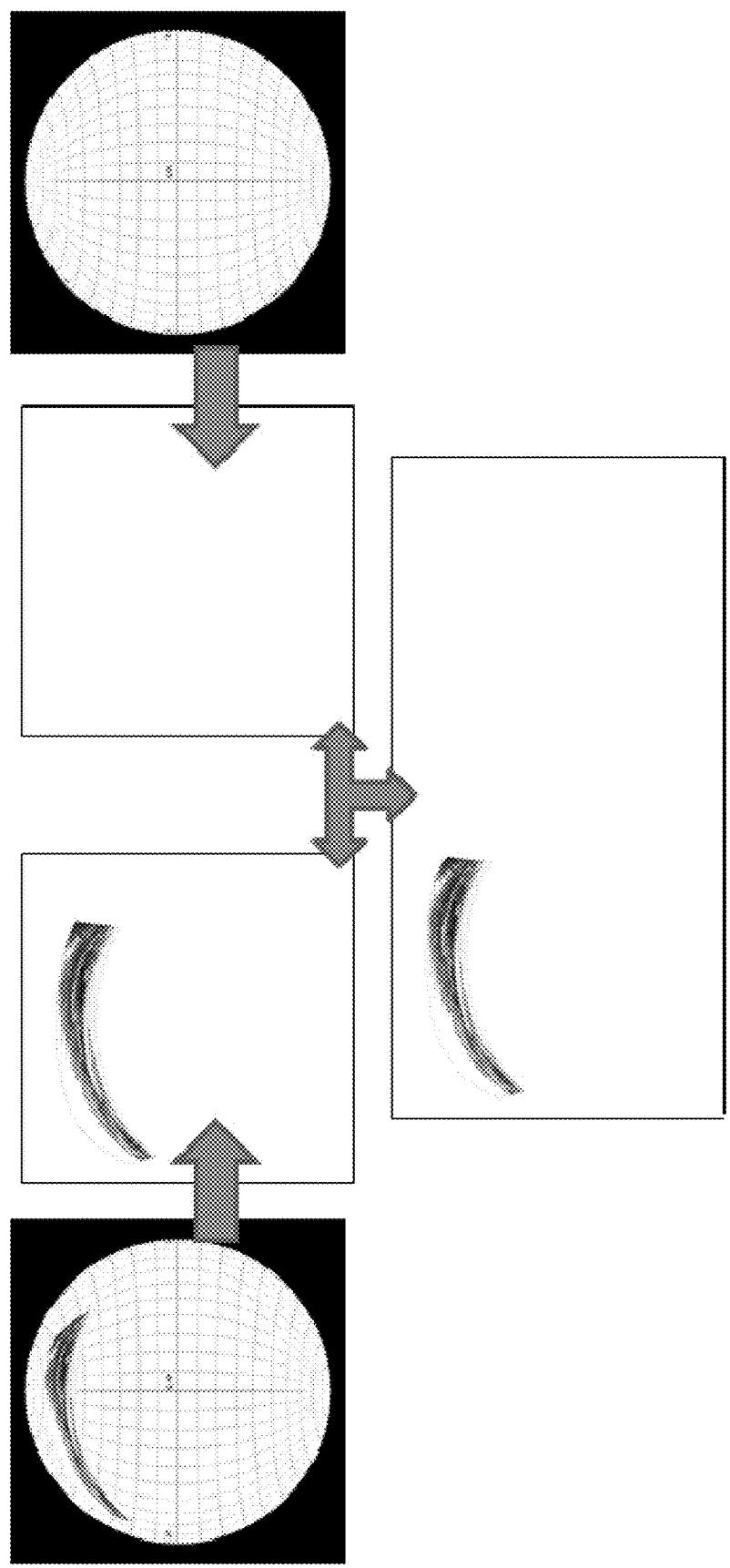
FIG. 13 illustrates generation of the effect panorama frame through application of a stitching technique to merge the two half-sphere frames into a single panorama frame in accordance with various embodiments.
Figure 14:
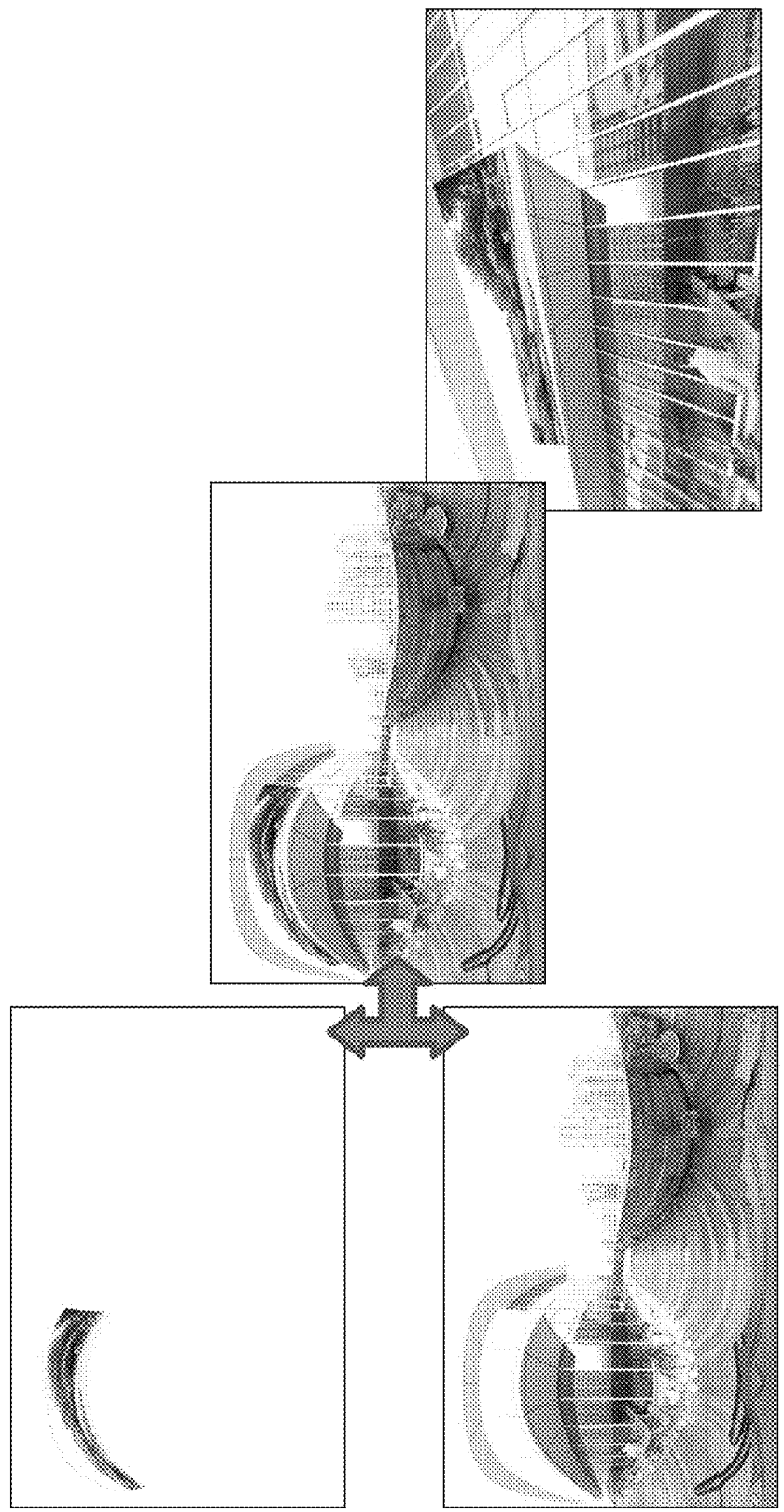
FIG. 14 illustrates merging of the effect panorama frame with the original source panorama frame to generate an edited panorama frame in accordance with various embodiments.

As described above in connection with the flowchart of FIG. 9, the effects unit 110 then renders the effect. This is accomplished by setting camera positions on opposite sides of the spherical representation with the desired effect applied to the model. Two half-sphere frames containing the effect are then generated, as shown in FIG. 12. The projection model of the camera may be adjusted to obtain the entire content of the half-sphere frames. To generate the effect panorama frame, the effects unit 110 applies a stitching technique to merge the two half-sphere frames into a single panorama frame, as shown in FIG. 13. Next, with reference to FIG. 14, the effect panorama frame is blended or combined with the original source panorama frame to generate an edited panorama frame with the effect now applied. Note that the effects editing techniques disclosed herein may be utilized for a wide range of applications, including but not limited to the insertion of subtitles, picture-in-picture (PiP), image or graphics (e.g., sticker) effects into 360 video.

Figure 17:
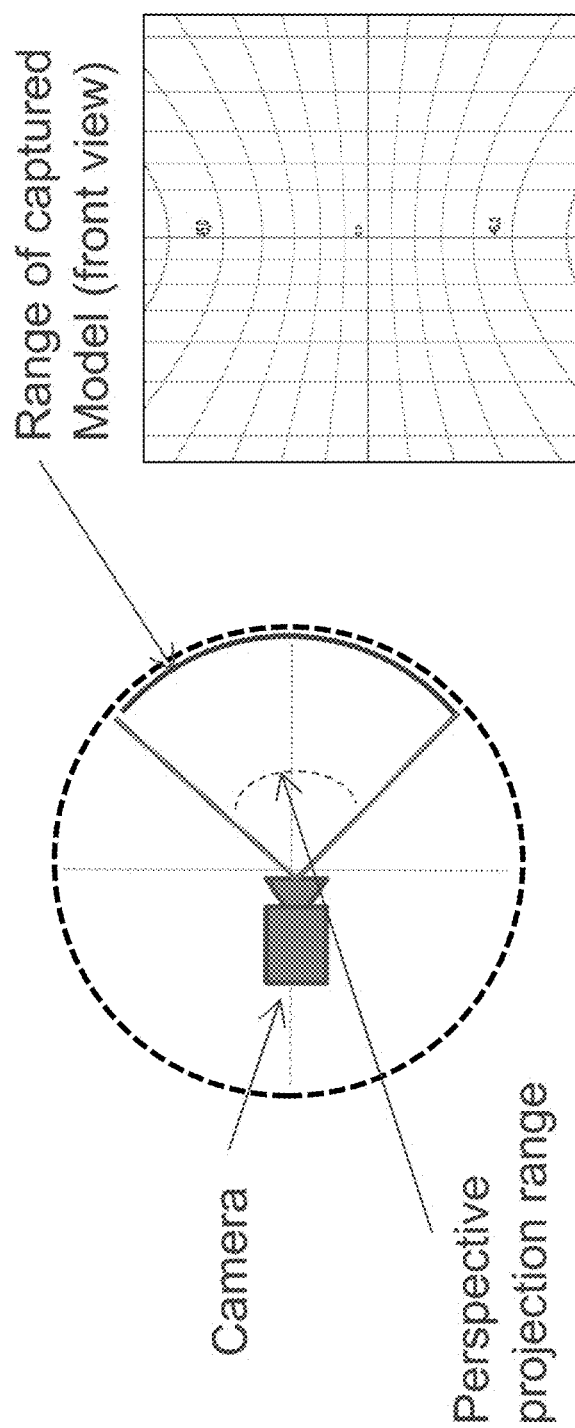
FIG. 17 illustrates a rendering operation where the camera is positioned at the center of the spherical representation with the desired effect applied and where a front view rectilinear projection is then captured in accordance with various embodiments.
Figure 18:
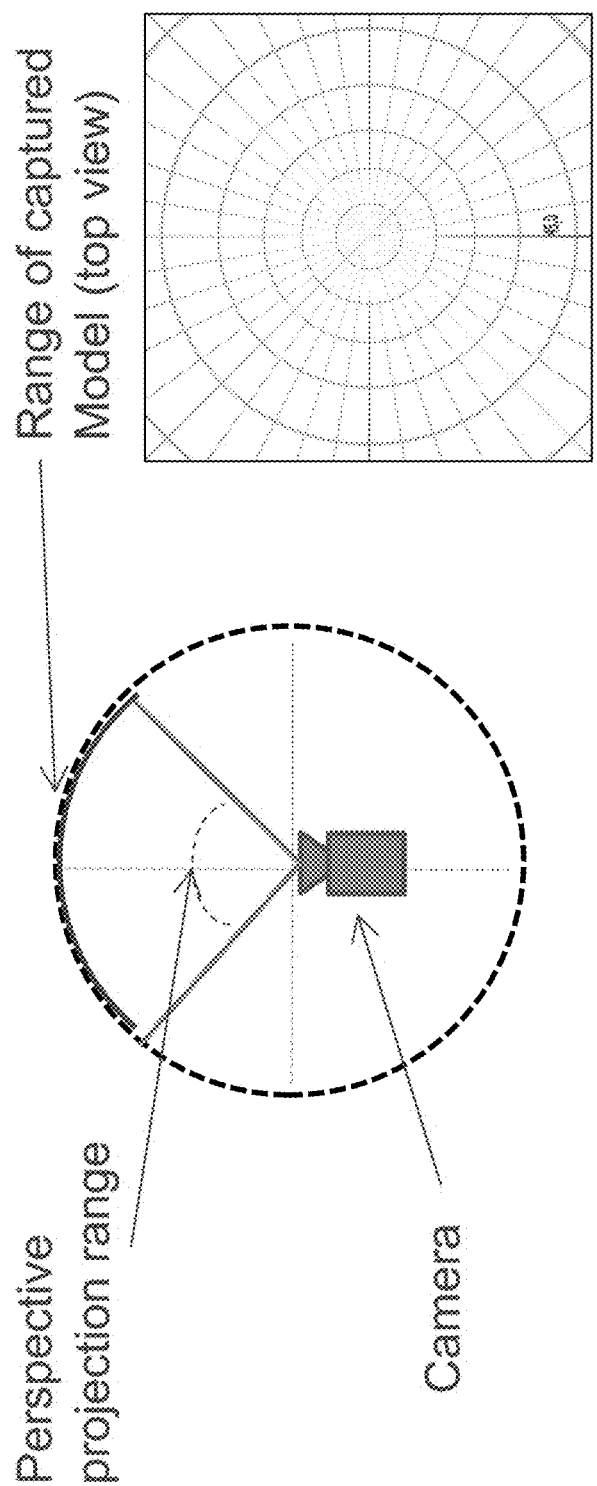
FIG. 18 illustrates a rendering operation where the camera is positioned at the center of the spherical representation with the desired effect applied and where a top view rectilinear projection is then captured in accordance with various embodiments.

In accordance with alternative embodiments, multiple rectilinear frames (rather than two half-sphere frames) are captured and stitched together. In accordance with such embodiments, the effect is applied to a desired region on the sphere, and the effect is then rendered as six rectilinear frames. An effect panorama frame is then generated from the six rectilinear frames. The effect panorama is then blended with the source panorama frame. To illustrate, reference is made to FIGS. 17-19. FIG. 17 illustrates a rendering operation where the camera is positioned at the center of the spherical representation with the desired effect applied and where a front view rectilinear projection is then captured. In accordance with some embodiments, the effects unit 110 (FIG. 1) renders the effect by positioning the camera at the center of the spherical representation with the desired effect applied to the model. The camera projection and field-of-view parameters are adjusted by the effects unit 110 so that the projection frame covers the proper area of the spherical model such that that the captured rectilinear projection frames cover the entire sphere model. While the projection frames collectively cover the entire sphere model, each individual projection frame does not have to be equal in size, shape, and so on. For example, each projection frame does not have to be limited to having the same 60 degree angle of view. On the other hand, the projection frames may cover the same area or overlap one another. The camera is moved to the desired view (e.g., front view) and a rectilinear projection of the view is then captured. Reference is made to FIG. 18, which illustrates a rendering operation where the camera is positioned at the center of the spherical representation with the desired effect applied and where a top view rectilinear projection is then captured in accordance with various embodiments. Specifically, the effects unit 110 (FIG. 1) positions the camera to capture the desired view (e.g., the top view) and a rectilinear projection of that view is captured. The effects unit 110 repeats this process for the remaining views (e.g., left view, right view, back view, downward view) while ensuring that the rectilinear projection frames cover the entire sphere model. In accordance with some embodiments, six rectilinear projection frames are captured.

Figure 19:
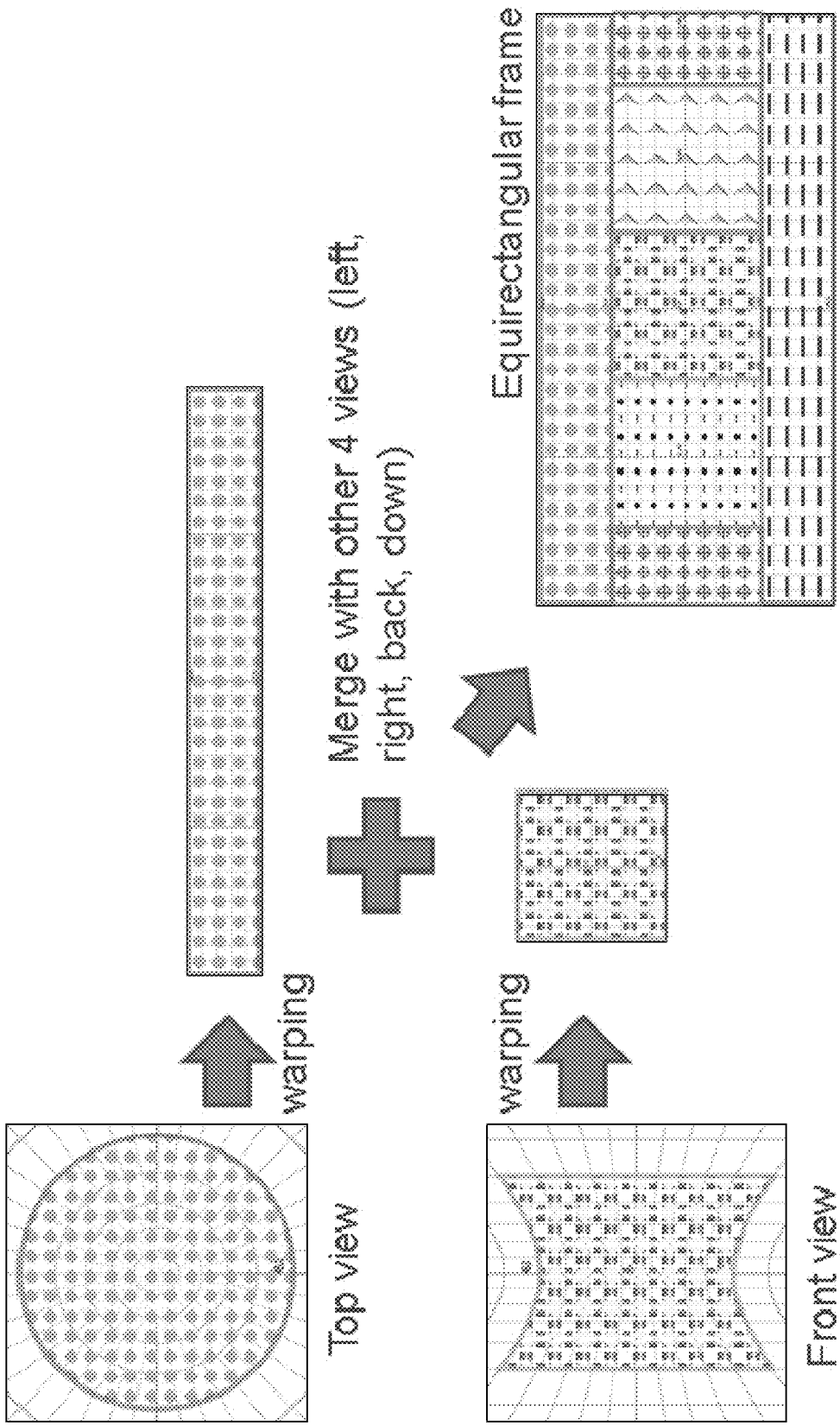
FIG. 19 illustrates generation of the effect panorama frame by application of a stitching technique to merge six rectilinear projection frames into a single panorama frame in accordance with various embodiments.

After the six rectilinear views are captured, the views are then stitched or merged together to form a single panorama frame. Reference is made to FIG. 19, which illustrates generation of the effect panorama frame by application of a stitching technique to merge the six rectilinear projection frames (depicted in FIG. 19 with different patterns) into a single panorama frame in accordance with various embodiments. As shown, an effect panorama frame containing the effect is generated by applying a stitching technique to merge the six rectilinear projection frames into a single panorama frame. For some embodiments, the stitching process may comprise first warping the rectilinear frames into parts of an equirectangular frames and then stitching or merging these parts into a single effect panorama frame. Note that the stitching or merging operation may be performed by the CPU or GPU of the computing device 102.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A method implemented in a computing device for inserting an effect into a 360 video, comprising:
   receiving the effect from a user;
   receiving a target region from the user, the target region corresponding to a location within the 360 video for inserting the effect, wherein receiving the target region from the user comprises:
       positioning the effect in a front view of the spherical model; and
       receiving input from the user for rotating the spherical model while a location of the effect remains static, wherein the spherical model is rotated until the effect is located in the target region within the spherical model; and
   for each frame in the 360 video:
       inserting the effect on a surface of a spherical model based on the target region;
       generating two half-sphere frames containing the effect from the spherical model;
       stitching the two half-sphere frames to generate a panoramic representation of the effect; and
       blending the panoramic representation of the effect with an original source panorama to generate a modified 360 video frame with the effect.

2. The method of claim 1, wherein the input from the user further specifies a size of the effect.

3. The method of claim 1, wherein the effect is inserted on the surface of a spherical model based on the target region utilizing texture mapping, and wherein inserting the effect on the surface of the spherical model comprises:
   generating a plurality of polygons for the surface of the spherical model; and
   applying the effect to the target region, wherein the effect is applied as texture data to polygons located in the target region.

4. A method implemented in a computing device for inserting an effect into a 360 video, comprising:
   receiving the effect from a user;
   receiving a target region from the user, the target region corresponding to a location within the 360 video for inserting the effect;
   for each frame in the 360 video:
       inserting the effect on a surface of a spherical model based on the target region;
       generating two half-sphere frames containing the effect from the spherical model, wherein generating the two half-sphere frames containing the effect from the spherical model comprises:
           setting cameras on opposing sides of the spherical model with the effect applied to the spherical model; and
           capturing, with the cameras, two half-sphere frames of the spherical model to generate two half-sphere frames containing the effect;
       stitching the two half-sphere frames to generate a panoramic representation of the effect; and
       blending the panoramic representation of the effect with an original source panorama to generate a modified 360 video frame with the effect.

5. The method of claim 4, wherein stitching the two half-sphere frames to generate the panoramic representation of the effect comprises:
   warping the two half-sphere frames into two square frames; and
   merging the two square frames into a single effect panorama frame.

6. The method of claim 5, wherein warping the two half-sphere frames into the two square frames is performed using spherical-to-cylindrical coordinate transformation, wherein the spherical-to-cylindrical coordinate transformation is applied based on parameters of the spherical model and camera settings of a camera used to capture the 360 video.

7. The method of claim 1, wherein receiving the target region from the user comprises:
   generating a two-dimensional (2D) view from the 360 video;
   receiving input from the user specifying the target region based on the 2D view;
   dividing the target region into a plurality of polygons; and
   mapping a position of each vertex of each polygon in the target region to spherical coordinates.

8. A system, comprising:
   a memory storing instructions; and
   a processor coupled to the memory and configured by the instructions to at least:
       receive an effect from a user;
       receive a target region from the user, the target region corresponding to a location within the 360 video for inserting the effect, wherein receiving the target region from the user comprises:
           positioning the effect in a front view of the spherical model; and
           receiving input from the user for rotating the spherical model while a location of the effect remains static, wherein the spherical model is rotated until the effect is located in the target region within the spherical model; and
       for each frame in the 360 video:
           insert the effect on a surface of a spherical model based on the target region;
           generate two half-sphere frames containing the effect from the spherical model;
           stitch the two half-sphere frames to generate a panoramic representation of the effect; and
           blend the panoramic representation of the effect with an original source panorama to generate a modified 360 video frame with the effect.

9. The system of claim 8, wherein the input from the user further specifies a size of the effect.

10. The system of claim 8, wherein the effect is inserted on the surface of a spherical model based on the target region utilizing texture mapping, and wherein inserting the effect on the surface of the spherical model comprises:
    generating a plurality of polygons for the surface of the spherical model; and applying the effect to the target region, wherein the effect is applied as texture data to polygons located in the target region.

11. A system, comprising:
a memory storing instructions; and
a processor coupled to the memory and configured by the instructions to at least:
receive an effect from a user;
receive a target region from the user, the target region corresponding to a location within the 360 video for inserting the effect; and
for each frame in the 360 video:
insert the effect on a surface of a spherical model based on the target region;
generate two half-sphere frames containing the effect from the spherical model, wherein generating the two half-sphere frames containing the effect from the spherical model comprises:
setting cameras on opposing sides of the spherical model with the effect applied to the spherical model; and
capturing, with the cameras, two half-sphere frames of the spherical model to generate two half-sphere frames containing the effect;
stitch the two half-sphere frames to generate a panoramic representation of the effect; and
blend the panoramic representation of the effect with an original source panorama to generate a modified 360 video frame with the effect.

12. The system of claim 11, wherein stitching the two half-sphere frames to generate the panoramic representation of the effect comprises:
warping the two half-sphere frames into two square frames; and
merging the two square frames into a single effect panorama frame.

13. The system of claim 12, wherein warping the two half-sphere frames into the two square frames is performed using spherical-to-cylindrical coordinate transformation, wherein the spherical-to-cylindrical coordinate transformation is applied based on parameters of the spherical model and camera settings of a camera used to capture the 360 video.

14. The system of claim 8, wherein receiving the target region from the user comprises:
generating a two-dimensional (2D) view from the 360 video;
receiving input from the user specifying the target region based on the 2D view;
dividing the target region into a plurality of polygons; and
mapping a position of each vertex of each polygon in the target region to spherical coordinates.

15. A non-transitory computer-readable storage medium storing instructions to be implemented by a computing device having a processor, wherein the instructions, when executed by the processor, cause the computing device to at least:
receive an effect from a user;
receive a target region from the user, the target region corresponding to a location within the 360 video for inserting the effect, wherein receiving the target region from the user comprises:
positioning the effect in a front view of the spherical model; and
receiving input from the user for rotating the spherical model while a location of the effect remains static, wherein the spherical model is rotated until the effect is located in the target region within the spherical model; and
for each frame in the 360 video:
insert the effect on a surface of a spherical model based on the target region;
generate two half-sphere frames containing the effect from the spherical model;
stitch the two half-sphere frames to generate a panoramic representation of the effect; and
blend the panoramic representation of the effect with an original source panorama to generate a modified 360 video frame with the effect.

16. The non-transitory computer-readable storage medium of claim 15, wherein the effect is inserted on the surface of a spherical model based on the target region utilizing texture mapping, and wherein inserting the effect on the surface of the spherical model comprises:
generating a plurality of polygons for the surface of the spherical model; and
applying the effect to the target region, wherein the effect is applied as texture data to polygons located in the target region.

17. The non-transitory computer-readable storage medium of claim 15, wherein receiving the target region from the user comprises:
generating a two-dimensional (2D) view from the 360 video;
receiving input from the user specifying the target region based on the 2D view;
dividing the target region into a plurality of polygons; and
mapping a position of each vertex of each polygon in the target region to spherical coordinates.

18. A non-transitory computer-readable storage medium storing instructions to be implemented by a computing device having a processor, wherein the instructions, when executed by the processor, cause the computing device to at least:
receive an effect from a user;
receive a target region from the user, the target region corresponding to a location within the 360 video for inserting the effect; and
for each frame in the 360 video:
insert the effect on a surface of a spherical model based on the target region;
generate two half-sphere frames containing the effect from the spherical model, wherein generating the two half-sphere frames containing the effect from the spherical model comprises:
setting cameras on opposing sides of the spherical model with the effect applied to the spherical model; and
capturing, with the cameras, two half-sphere frames of the spherical model to generate two half-sphere frames containing the effect;
stitch the two half-sphere frames to generate a panoramic representation of the effect; and
blend the panoramic representation of the effect with an original source panorama to generate a modified 360 video frame with the effect.

* * * * *